(12) United States Patent
Diep et al.

(10) Patent No.: US 7,043,125 B2
(45) Date of Patent: May 9, 2006

(54) OPTICAL WAVEGUIDE FIBER FOR LOCAL ACCESS

(75) Inventors: Phong Diep, Horseheads, NY (US); James C. Fajardo, Painted Post, NY (US); Ming-Jun Li, Horseheads, NY (US); Daniel A. Nolan, Corning, NY (US); Gang Qi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 493 days.

(21) Appl. No.: 10/145,327

(22) Filed: May 13, 2002

(65) Prior Publication Data

US 2003/0026566 A1      Feb. 6, 2003

Related U.S. Application Data

(60) Provisional application No. 60/308,712, filed on Jul. 30, 2001.

(51) Int. Cl.
*G02B 6/02* (2006.01)

(52) U.S. Cl. ...................................................... 385/123
(58) Field of Classification Search ................ 385/123, 385/124, 125, 126, 127
See application file for complete search history.

(56) References Cited

U.S. PATENT DOCUMENTS

| 4,641,917 A | 2/1987 | Glodis et al. ............. 350/96.33 |
| 5,715,346 A | 2/1998 | Liu ............................. 385/124 |
| 5,781,684 A | 7/1998 | Liu ............................. 385/124 |
| 6,266,467 B1 | 7/2001 | Kato et al. ................... 385/123 |
| 6,321,016 B1 * | 11/2001 | Tirloni et al. ................ 385/127 |
| 6,434,310 B1 | 8/2002 | Liu et al. ..................... 385/123 |
| 6,470,126 B1 * | 10/2002 | Mukasa ........................ 385/123 |
| 2003/0026565 A1 * | 2/2003 | Anderson et al. ........... 385/123 |

OTHER PUBLICATIONS

Lazay et al, "Developments in Single-Mode Fiber Design, Materials, and Performance at Bell Laboratories", IEEE Journal of Quantum Electronics, vol. QE-18, No. 4, Apr. 1982, pp. 504-510.

Wiedenmann et al. "Design and Analysis of Single-Mode Oxidized VCSEL's for High-Speed Optical Interconnects", IEEE Journal of Selected Topics in Quantum Electronics, vol. 5, No. 3, May/Jun. 1999, pp. 503-511.

Aoki et al. "Fundamental Study of Parallel Moduling Scheme Based on a Micro-Optical Bench and Collimating Planar Microlenses", 7th Microoptics Conference, MOC '99, Chiba, Japan Jul. 14-16, 1999, vol. 39, No. 3B, pp. 1529-1532.

Young et al, "Spectral response during modulation of hybrid ion implanted selectively oxidized VCSELs", Technical Digest Summary of papers Presented at the Conference on Lasers and Electro-Optics, CLEO 2001, pp. 108-109.

Ishii, et al. "Ink-Jet Fabrication of Polymer Microlens for Optical-I/O Chip Packaging", 7th Microoptics Conference, MOC '99, Chiba, Japan Jul. 14-16, 1999, vol. 39, No. 3B, pp. 1490-1493.

* cited by examiner

*Primary Examiner*—Sung Pak
(74) *Attorney, Agent, or Firm*—Joseph M. Homa; William J. Chervenak (57) ABSTRACT

Disclosed is a single mode optical waveguide fiber having a low cut off wavelength, and mode field diameter and bend resistance similar to step index single mode optical waveguide fiber designed for use at 1310 nm. By including a clad region of raised refractive index spaced apart from the core region of the single mode optical waveguide fiber, the cut off wavelength can be reduced to 850 nm. The single mode optical waveguide fiber in accord with the invention may also have a core region having a reduced refractive index on centerline surrounded by a region of higher refractive index and a clad region which is substantially uniform. The single mode optical waveguide fiber is thus ideally suited for use with the low cost, reliable VCSEL operating at 850 nm, a Fabry-Perot laser operating at 1310 nm, or a distributed feedback laser operating at 1550 nm thereby enabling low cost, easily installed, home access portions of the broadband telecommunications system.

35 Claims, 5 Drawing Sheets

OPTICAL WAVEGUIDE FIBER FOR LOCAL ACCESS

This application claims the benefit of and priority to U.S. Provisional Patent Application No. 60/308,712, filed Jul. 30 2001.

BACKGROUND OF THE INVENTION

1. Field of the Invention

The present invention relates generally to an optical waveguide fiber designed for single mode operation over an extended wavelength range, and particularly to such a fiber having a core size and bend resistance comparable to step index single mode optical waveguide fiber.

2. Technical Background

Delivery of broadband telecommunication capability to a local area, such as an office building or residential neighborhood, presents a different set of requirements in comparison to those for longer distance telecommunications, for example interstate or intra-city loop telecommunications. Local area broadband telecommunications, also called local access or home access broadband telecommunications, is characterized by a multiplicity of home or local nodes located relatively close together, each of which must be connected into a main telecommunication line leading to a distribution node, which is typically called the central office. The distribution node serves as a hub that carries information back and forth between each of the local nodes and the service providers, offering such services as interactive television, voice communication, or facsimile communication. The high concentration of nodes increases the impact of splicing and connecting on system installation, span length as limited by span attenuation, and maintenance cost. In addition, the cost and reliability of signal sources gains in importance. This is especially true of the sources configured to transmit signals from the plurality of local nodes back to the distribution node.

The concept of selecting the parts of a telecommunication system in order to optimize its operation has successfully been applied to longer distance telecommunications systems. Optimization refers to reaching a balance among such factors as system cost, system reliability, and quality of the services provided. An example of optimization of longer distance systems is compensation of optical waveguide fiber total dispersion by using optical waveguide fibers having different sign of total dispersion relative to one another. This strategy has successfully extended the distance between electro-optical regenerators in such systems. Reducing the number of regenerators has decreased system cost and improved system reliability.

In intra-city or metro applications, which typically require an increased number of nodes in comparison to an inter-city link, ways have been sought to decrease the cost of each node while maintaining quality of service, i.e., signal integrity. Directly modulated distributed feedback lasers used in combination with negative dispersion optical waveguide fiber results in the waveguide fiber compensating the positive chirp of the laser. The system is optimized because the proper combination of signal source and fiber results in signal pulse compression.

In typical compensation strategies, the system components are engineered to compensate one another so that signal quality is maintained while reducing the required number of regenerators.

In the present instance, the case of local access, vertical cavity surface emitting lasers (VCSEL) have been identified as desirable sources for use in the home access nodes. The VCSEL is inexpensive and reliable. An additional desirable feature of the VCSEL is its large emitting area which provides for easier alignment, i.e., optical coupling, of the laser and an optical waveguide fiber. However, the cost of the VCSEL increases dramatically for laser wavelengths above 1000 nm. Thus the optical waveguide fiber low attenuation window around 1300 nm or 1550 nm is not compatible with a low cost VCSEL. The low attenuation window around 850 nm is compatible with a low cost VCSEL, thus motivating a search for a suitable optical waveguide fiber designed to operate around the 850 nm wavelength window.

Multimode optical waveguide fiber having, at a wavelength of 850 nm, bandwidth above 500 MHz-km and attenuation less than 0.4 dB/km has been available for several years. However, the use of multimode fiber in the home access node can be expected to result in signal degradation due to modal noise, especially in the case where a narrow-band laser source, such as a VCSEL, is used.

The increase in number and complexity of services to the home will place an emphasis on achieving broadened operating wavelength bands. In particular, demand will increase for expansion into the attractive operating window at wavelengths in the range above 1300 nm, particularly in the operating wavelength windows around 1310 nm and 1550 nm. At these higher wavelengths, a Fabry-Perot cavity laser can advantageously be used as a signal source provided the total dispersion of the optical waveguide fiber is suitably low. The Fabry-Perot laser is typically reliable and low in cost, but has a relatively wide spectral width. The use of this laser type is appropriate in system portions of shorter span length operating at the wavelengths of higher fiber dispersion or at wavelengths near the zero dispersion wavelength of the optical waveguide fiber. An optical waveguide fiber having properties that can accommodate both a VCSEL laser source as well as a Fabry-Perot laser source would offer a desirable degree of flexibility in local access system design. For example, VCSEL laser sources operating in a wavelength band near 850 nm could be used within a home or office building. The Fabry-Perot laser sources operating near a zero dispersion wavelength in the vicinity of 1310 nm could be used for transmissions originating outside the residence or office where longer span lengths are typically used.

Single mode optical waveguide fiber having a cut off wavelength less than 850 nm has been manufactured. To achieve this lower cut off wavelength, the numerical aperture or the core diameter must be reduced. This reduction results in increased difficulty in making optical connections, for example, splice or coupling connections, and in weaker guiding of signals at wavelengths far from cut off, such as signals in the operating windows around 1310 nm and 1550 nm. Many of the broadband telecommunications systems in use today operate at either or both of these higher wavelength windows.

Figure 1:
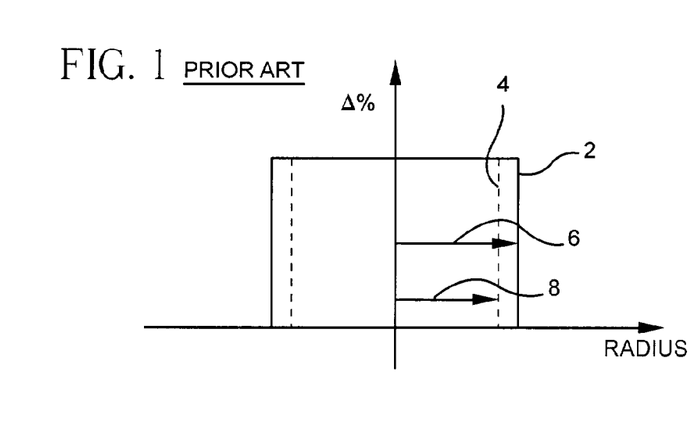
FIG. 1 is a chart of relative refractive index versus radius for step index single mode optical waveguide fibers in accord with the prior art.

An example of a step index single mode optical waveguide fiber in accord with the prior art is illustrated in FIG. 1. Step index 2 illustrates a step index single mode optical waveguide fiber having a relative refractive index percent, $\Delta\%$, and radius 6 selected to provide a cut off wavelength of about 1200 nm. Typically, the core diameter is about 9 µm and the $\Delta\%$ is about 0.3% to 0.4%. In order to alter the step index 2 of FIG. 1 to provide a cutoff of about 850 µm, the core diameter 6 must be reduced to core diameter 9. In the illustration, the reduction in diameter to achieve the lower cut off wavelength is about 20%. The lower value of core diameter increases the difficulty of making optical connections with components or other fibers in a telecommunications system.

Thus there is a need for a single mode optical waveguide fiber that has a cut off wavelength less than about 850 nm but yet guides light well at wavelengths around the 1310 nm and 1550 nm operating windows. An additional desired property of such a single mode optical waveguide fiber is that it has core diameter sufficiently large to facilitate the making of optical alignments and connections. Also, an optical waveguide fiber property which grows in importance in the part of a communication system that reaches into individual homes or office buildings is resistance to bend induced loss over an extended wavelength band.

DEFINITIONS

The following definitions are in accord with common usage in the art.

The relative refractive index percent, $\Delta\% = 100 \times (n_i^2 - n_c^2)/2n_i^2$, where $n_i$ is the maximum refractive index in region i, unless otherwise specified, and $n_c$ is the refractive index of the silica cladding region. In those cases in which the refractive index of a segment is less than the refractive index of the silica cladding region, the relative index percent is negative and is calculated at the point at which the relative index is most negative unless otherwise specified.

The term α-profile refers to the dependence of refractive index on waveguide fiber radius and is expressed in terms of $\Delta(b)\%$, where b is radius, by the equation, $\Delta(b)\% = \Delta(b_o)(1-[|b-b_o|/(b_1-b_o)]^\alpha)$, where $b_o$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the α-profile, $b_f$ is the final point of the α-profile, and α is an exponent which is a real number.

The pin array bend test is used to compare relative resistance of waveguide fibers to bending. To perform this test, attenuation is measured for a waveguide fiber with essentially no induced bending loss. The waveguide fiber is then woven about the pin array and attenuation again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to the portion of the periphery of the pins contacted by the fiber. The test pertains to macro-bend resistance of the waveguide fiber.

Another bend test referenced herein is the lateral load test. In this test a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation, typically expressed in units of dB/m, is measured. This increase in attenuation is the lateral load attenuation of the waveguide.

A further bend test referenced herein is the mandrel wrap test. The attenuation induced by wrapping an optical waveguide fiber about a mandrel is measured. Standard test conditions include 100 turns of waveguide fiber around a 75 mm diameter mandrel and 1 turn of waveguide fiber around a 32 mm diameter mandrel. Other mandrel sizes such as 50 mm diameter or 20 mm diameter can be used. The attenuation induced by the wrapping about the mandrel is typically expressed in dB.

SUMMARY OF THE INVENTION

A first aspect of the present invention is a single mode optical waveguide fiber having a core region surrounded by a clad layer. The clad layer has a first and a second region, the second region having a higher relative refractive index percent than the first region. The second region of the clad layer is spaced apart from the core region. The first region of the clad layer is situated between the core region and the second clad region. The relative refractive index percents and the core radius are selected to adjust cut off wavelength of the fiber to a desired value. In particular, the cut off wavelength of the single mode optical waveguide fiber in accord with the invention, measured with the fiber in cabled configuration, is no greater than about 850 nm. As is discussed below, cut off wavelength changes as the configuration of the fiber changes. The term cut off wavelength as used throughout this specification refers to cut off as measured on the fiber in cabled configuration unless expressly stated otherwise.

In an embodiment of the first aspect of the invention, the second clad begins at a radius two to five times greater than the radius of the core region. Thus if the core region radius is designated as r, then the radius at which the second clad region begins has a range from 2r to 5r. Preferably the second clad region begins at a radius having a range from 2.5r to 3.5r. The relative refractive index of the second clad region has a range from 0.05% to 0.10%.

In an embodiment in accord with the invention, r is greater than or equal to 3.5 µm and preferably greater than or equal to 4 µm.

In a further embodiment of the invention, the core region of the single mode optical waveguide fiber is described by the equation of an α-profile, defined above. The α value ranges from about 0.8 to infinity, where from the equation it is clear that as α becomes large without bound, the shape of the profile becomes a step. The relative refractive index of the core region in this embodiment has a range from 0.30% to 0.50% and preferably 0.32% to 0.40%.

The single mode optical waveguide fiber in accord with the invention exhibits good resistance to bend. At a wavelength of 1500 nm or less, that is, to a lower limit near the cut off wavelength of 850 nm, the attenuation induced in the fiber is no greater than 8 dB when the fiber is configured in the pin array bend test. When the fiber is wrapped 100 turns about a 50 mm mandrel, the attenuation induced in the fiber is no greater than 0.05 dB at 1500 nm or less.

A second aspect of the invention is an optical circuit including a single mode optical waveguide fiber having a cut off wavelength no greater than about 850 nm optically coupled to a laser source selected from a group consisting of a single mode vertical cavity laser, a Fabry-Perot laser, and a distributed feedback (DFB) laser. A circuit in accord with the invention can incorporate one or more of each laser type. In an embodiment of the optical circuit, at least two lasers operating at different wavelengths are multiplexed into an end of the fiber to provide for higher bandwidth operation. The VCSEL typically has an operating wavelength that extends from the cut off wavelength, about 850 nm in the instant case, up to about 1000 nm. The Fabry-Perot laser is typically operated in a wavelength range that includes the wavelength 1310 nm, although higher wavelength Fabry- Perot lasers may be used. A narrow spectral width DFB laser can also be used in the higher dispersion 1550 nm transmission window.

Use of a single mode optical waveguide fiber in accord with the invention enables a broadband system having only one optical waveguide fiber, because the fiber exhibits consistent, substantially uniform performance over the wavelength range of the lasers. Because a single fiber type meets the desired circuit performance parameters, fiber to fiber splicing occurs between like fibers, effectively minimizing power loss at the splices.

In embodiments of this aspect of the invention the single mode optical waveguide fiber is made in accord with the first aspect of the invention or the third aspect of the invention and embodiments thereof.

A third aspect of the invention is a single mode optical waveguide fiber having a core region and a surrounding clad layer. The core region and surrounding clad layer have respective refractive index profiles selected to provide a cut off wavelength no greater than about 850 nm and a mode field diameter not less than about 8.0 µm at 1550 nm. The mode field diameter at 850 nm is not less than 4.0 µm and the mode field diameter at 1310 nm is not less than about 6.0 µm.

In an embodiment of this third aspect of the invention the respective mode field diameters at 850 nm, 1310 nm, and 1550 nm are not less than about 5.0 µm, 7.5 µm, and 9.0 µm.

In another embodiment of the third aspect of the invention the core region has a centerline and a radius r and includes a central segment having a radius $r_o$ and a minimum relative refractive index percent $\Delta_o\%$. The central segment is surrounded by an annular segment having a radius $r_1$, a relative refractive index percent $\Delta_1\%$, and a portion of decreasing relative index percent. In accord with FIGS. 4 and 5, the radius $r_o$ is measured from the centerline to the point nearest the centerline where the relative refractive index is $\Delta_1\%$; the radius $r_1$ is measured from the centerline to the intersection of the extrapolation of the decreasing portion with the horizontal line defined by relative refractive index equal to zero; the core radius r is measured from the centerline to the point where the relative refractive index of the annular segment is zero. The relative refractive index percents and radii in this embodiment in accord with the invention are described by the relationships, $\Delta_o\% < \Delta_1\%$, and $r_o < r_1 < r$.

In yet a further embodiment in accord with the invention, $r_o$ has a range from about 0.5 µm to 2.0 µm, $r_1$ has a range from about 2.32 µm to 2.84 µm, r has a range from about 2.7 µm to 3.3 µm, $\Delta_o\%$ has a range from about −0.1% to 0.2%, and $\Delta_1\%$ has a range from about 0.75% to 1.3%. One method of achieving a negative relative refractive index percent is by doping the silica based glass with fluorine. This, and other methods of achieving negative relative refractive index percent on a waveguide fiber centerline are known in the art and will not be discussed further here.

In another embodiment of the invention, $r_o$ has a range from about 1.57 µm to 1.93 µm, $r_1$ has a range from about 3.04 µm to 3.72 µm, r has a range from about 5.45 µm to 6.67 µm, $\Delta_o\%$ has a range from about 0.09% to 0.11%, and $\Delta_1\%$ has a range from about 0.51% to 0.63%.

In yet another embodiment of the third aspect of the invention, the core region has a relative refractive index percent in the range from about 0.30% to 0.40% and a radius in the range of 4.0 µm to 4.5 µm. The clad layer includes a first region and a second region each having respective radii as defined below and a relative refractive index percent. The first region has a relative refractive index percent in the range from about −0.07% to −0.10% and a radius in the range from about 13.5 µm to 14.5 µm. The second region has a relative refractive index percent of about zero. The respective mode field diameters at 850 nm, 1310 nm, and 1550 nm are not less than about 6.5 µm, 8.0 µm, and 9.0 µm. The respective pin array bend losses at 850 nm, 1310 nm, and 1550 nm are not greater than about 0.00 dB, 0.01 dB and 19.5 dB. Advantageously, the wavelength at which total dispersion is zero is located near 1310 nm, which facilitates use of the wider spectral width Fabry-Perot laser sources in the 1310 nm operating window.

This third aspect of the invention may also be embodied in a single mode optical waveguide fiber having a clad region in accord with the first aspect of the invention and embodiments thereof.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 2:
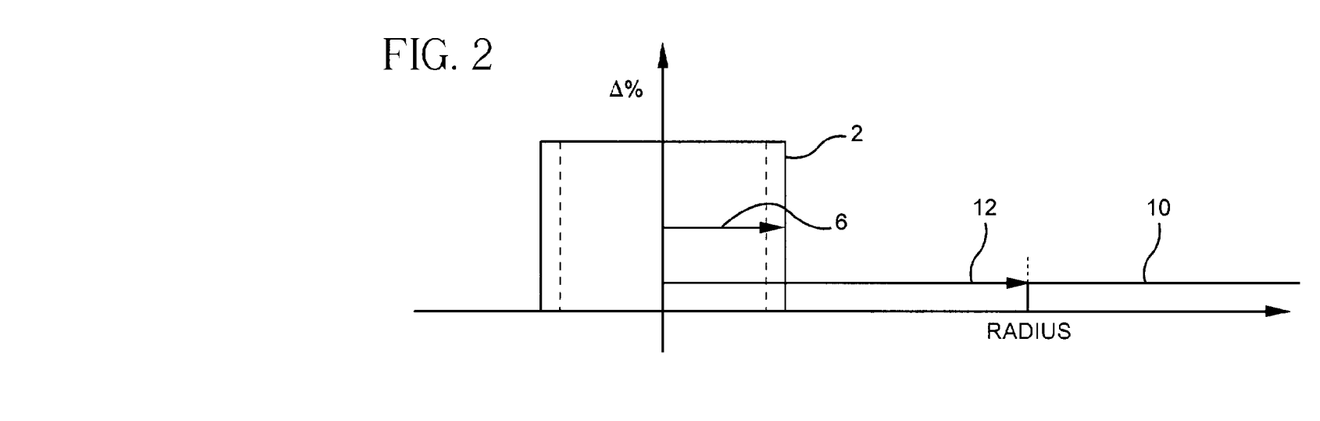
FIG. 2 is a chart of relative refractive index versus radius for a step index single mode optical waveguide fiber having a second clad region in accord with the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the present invention is shown in FIG. 2. Step index profile 2 having radius 6, the profile being substantially identical to profile 2 illustrated in FIG. 1, is expected to have a cut off wavelength, i.e., the wavelength above which only the LP01 mode is propagated over fiber lengths of several kilometers, of about 1200 nm. (The cut off wavelength in general changes with changes in the physical configuration of the optical waveguide fiber, the effective cut off value decreasing as bending is induced in the fiber. The system performance of the optical waveguide fiber is advantageously described in terms of the cut off wavelength of the fiber in cabled configuration, the configuration in which the fiber is usually used. ) However, the cladding region 10, a region of increased refractive index relative to the clad layer between step index profile 2 and cladding region 10, serves to decrease the cut off wavelength of the single mode optical waveguide fiber to about 850 µm or less. Cladding region 10 is shown as a step beginning at radius 12, the radius having a length not less than twice radius 6 and not greater than about five times radius 6 and the step having a relative refractive index percent in the range of 0.05% to 0.10%. Region 10 can extend from radius 12 to the surface of the waveguide fiber, although the region may be truncated before reaching the fiber surface and still be effective to prevent the propagation of the LP11 and LP02 modes over a fiber length not greater than about one kilometer and typically not greater than several hundred meters. That is, for the core profile 2 and clad region 10 illustrated in FIG. 2 the next higher modes above the fundamental LP01 mode are highly attenuated and so will not propagate a significant distance in the optical waveguide fiber. In the example profile of FIG. 2, radius 12 is about three times the radius 6 of step index profile 2.

Cladding region 10 can contain a refractive index increasing dopant material to increase its relative refractive index percent in comparison to that of the intervening clad region extending from core region 2 to clad region 10. As an alternative the intervening clad region can contain a dopant material that decreases refractive index. The condition that the second region have a relative refractive index percent greater than that of the intervening clad region is met in this latter case as well.

Because a high fraction of the propagated light signal power is propagated inside radius 12, clad region 10 has no significant effect on the waveguide fiber attenuation with respect to the LP01 mode.

In addition, the single mode optical waveguide fiber design has a core region substantially identical to that of step index single mode optical waveguide fiber designed for operation at 1310 nm, that is, having a cut off wavelength of about 1200 nm. Thus, attenuation due to bending induced in the waveguide fiber in accord with the invention will be nearly the same as that for step index fiber designed for 1310 nm operation. Also the mode field diameter will be essentially identical to that of the step index fiber designed for operation at 1310 nm.

With regard to fiber performance in bending, attenuation induced by bend in the single mode optical waveguide fiber in accord with the invention is characterized by: an induced attenuation of less than 0.05 dB at 1310 nm and less than 0.10 dB at 1500 nm when the fiber is wrapped 100 turns about a 50 mm diameter mandrel; an induced attenuation of less than 0.50 dB at 1500 nm when the fiber is wrapped 1 turn about a 32 mm diameter mandrel; an induced attenuation of less than 1.0 dB/m at wavelengths less than 1500 nm under lateral load testing; and, an induced attenuation of less than 8 dB at wavelengths less than 1500 nm when the fiber is configured in a pin array bend test. The bend induced loss above 1500 nm, for example at 1550 nm and higher, can be expected to increase in comparison to the bend loss at of standard step index single mode optical waveguide fiber.

For the single mode optical waveguide fiber in accord with the invention, bend induced attenuation can be expected to be within acceptable limits up to 1625 nm, thus extending the useful range of the waveguide fiber to the wavelength range from 850 nm to 1625 nm, which includes the low attenuation operating wavelength windows around 1310 nm and 1550 nm.

Figure 3:
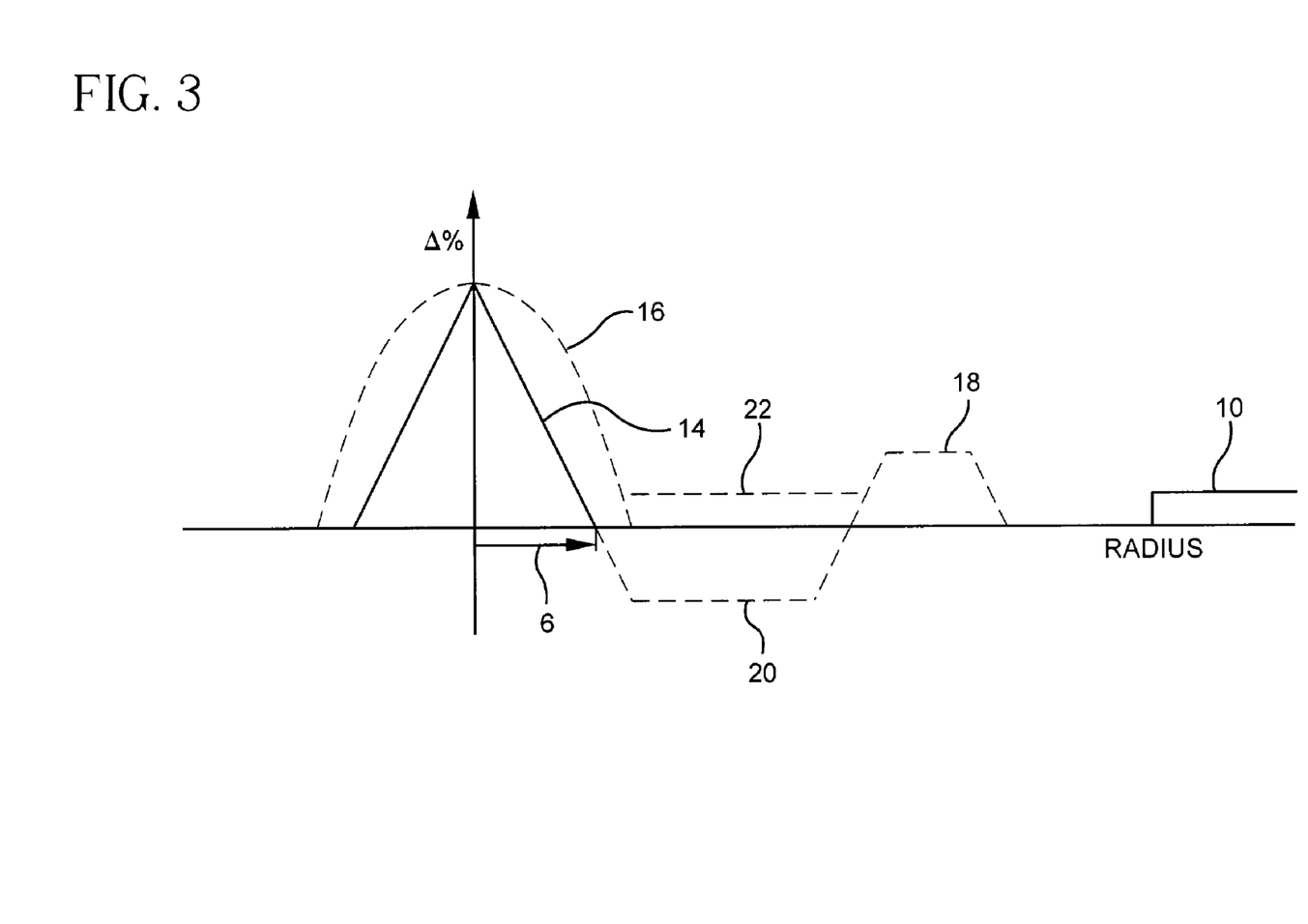
FIG. 3 is a chart of relative refractive index versus radius for alternative core regions having a second clad region in accord with the invention.

As is illustrated in FIG. 3, the core region of the single mode optical waveguide fiber in accord with the invention can have a plurality of shapes and relative refractive indexes. For example the core region index profile 14 of FIG. 3 is an α-profile having an α of 1. The radius 6 of refractive index profile 14 is in general different from that characteristic of the step index profile, which can be described as an α-profile having an α that is large without bound, i.e., effectively infinite. Refractive index profile 16 of FIG. 3 is again an α-profile, in this case having α about 2 to provide a parabolic shape. It will be understood that the relative diameters of the profiles in FIG. 3 are not drawn to scale and are intended simply to show alternative core region index profile shapes. For example, one would expect the radius 6 of the α=1 profile to be greater than that of the α=2 profile to provide the desired cutoff wavelength and bend resistance properties.

Other alternative core region profiles are illustrated in FIG. 3. A region of negative relative refractive index illustrated as dashed curve 20 can be included together with either the α=1 or α=2 central core shapes. A region of positive relative refractive index illustrated as dashed curve 22 can be included as an alternative to the core region indicated by dashed curve 20. The region of raised relative index illustrated as dashed curve 18, is an additional region that can be adjoined to any of the previous described combinations of core region configurations. Such additions to the core region profile are made in cases where particular single mode optical waveguide fiber properties such as location of zero dispersion wavelength, sign and magnitude of total dispersion, or of total dispersion slope are desired.

The feature common to each of these core region configurations is the placement of clad region 10, the region of raised index relative to a clad region located between the core region and raised index region 10, region 10 being tailored to provide a desired cut off wavelength.

By tailoring region clad region 10 to provide a cut off wavelength not greater than about 850 nm, the single mode optical waveguide fiber in accord with the invention is ideally suited for used with the low cost, and reliable vertical cavity surface emitting laser. As was noted above, the VCSEL is inexpensive to manufacture provided the laser wavelength is less than about 1000 nm. Because a silica based optical waveguide fiber has low attenuation at wavelengths around 850 nm, this wavelength is an advantageous choice for a system including a silica based single mode optical waveguide fiber optically coupled to a VCSEL. In addition, for the embodiments in which the zero of total dispersion is located near 1310 nm, the fiber is well suited for use with a low, cost, reliable Fabry-Perot laser operating in the 1310 nm wavelength window that typically extends from about 1250 nm to 1425 nm. A narrow line width distributed feedback laser (DFB) can be used in the operating wavelength range around 1550 nm where the total dispersion of the fiber is higher.

The low cost and reliability of the VCSEL, Fabry-Perot laser or DFB laser makes them ideal choices for home access portions of broadband telecommunications systems. The single mode optical waveguide fiber in accord with the invention fully enables incoming and outgoing broadband communication signals at the home because of its large mode field diameter, excellent bend resistance, and low attenuation over the typical operating wavelength range of such broadband systems.

The single mode optical waveguide fiber in accord with the invention provides a seamless interface between the central office and the home. The low cost, easy installation, and reliability of this interface is enabled by the invention.

Figure 4:
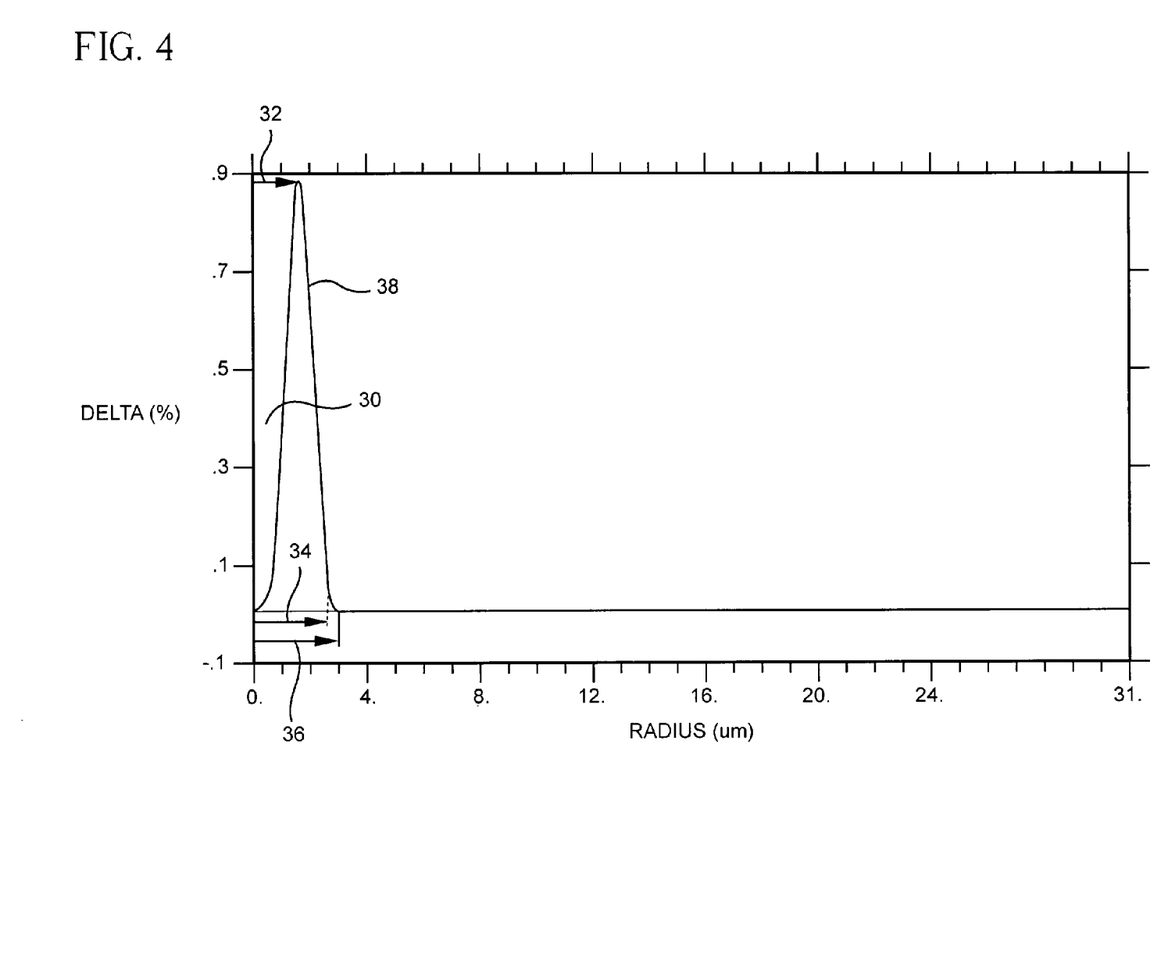
FIG. 4 is a chart of relative refractive index versus radius for a core region having a region of lower relative index on centerline in accord with the invention.

An alternative single mode optical waveguide fiber suitable for use in a telecommunications system incorporating a shorter wavelength VCSEL is illustrated in the refractive index profile in FIG. 4. This refractive index profile exhibits a core region that includes a rounded step index or an α-profile annular segment 38 surrounding a central segment 30 having a depressed relative index. The minimum relative refractive index percent of central segment 30 is about −0.1%.

The radius 32 of segment 30 is measured from the centerline of the core region to the point of annular segment 38, closest to the centerline, where the maximum relative refractive index percent occurs. Radius 32, $r_o$, of segment 30 may be considered the inner radius of segment 38. The radius 34, $r_1$, of segment 38 is measured from the centerline to the point at which the extrapolation of the descending portion of segment 38 intersects the horizontal axis (Δ%=0) of the chart of relative refractive index percent versus radius. The core region radius 36, r, is measured from the centerline to the point at which the relative refractive index percent of segment 38 is zero. The clad region in the embodiment illustrated in FIG. 4 is uniform and has a zero relative refractive index percent.

The core region profile parameters are, $r_o$ about 1.42 μm, $r_1$ about 2.58 μm, r about 3 microns, $\Delta_o\%$ about zero, and $\Delta_1\%$ about 0.88%. The clad layer is uniform and has a relative refractive index percent of zero.

The single mode optical waveguide fiber of FIG. 4 exhibits a fiber cut off wavelength of about 900 μm and a mode field diameter at 1550 nm of 8.8 μm. As is known in the art, the cut off wavelength of this optical waveguide fiber when placed in cabled configuration will be less than 850 nm. In addition the mode field diameters at 850 nm and 1310 nm for the single mode optical waveguide fiber of FIG. 4 are 4.7 μm and 7.1 μm respectively. Therefore, coupling efficiency will be acceptable between a VCSEL operating at 850 nm and the waveguide fiber having a profile in accord with FIG. 4. The splicing and connecting efficiency at 1310 nm and 1550 nm can be expected to be substantially the same as that for step index single mode optical waveguide fiber designed for operation at 1310 nm. It is known to persons skilled in the art that fiber cut off wavelength is reduced due to cabling of the fiber. Thus, a fiber cut off wavelength will be reduced to less than 850 μm when the fiber is placed in a cable configuration suitable for use in an optical waveguide telecommunications system.

Figure 5:
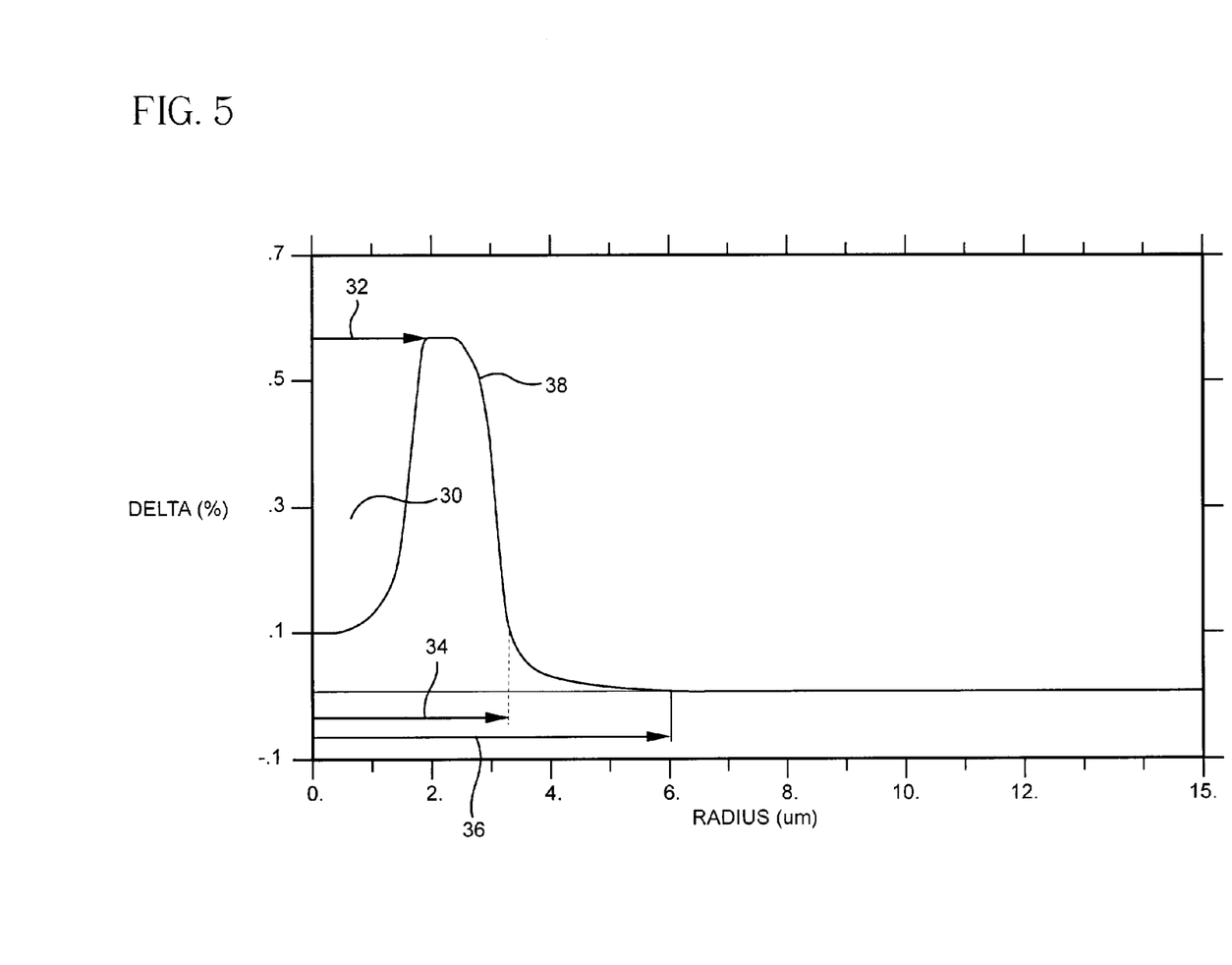
FIG. 5 is a chart of relative refractive index versus radius for a core region having a region of lower relative index on centerline in accord with the invention.

An alternative embodiment of the single mode optical waveguide fiber in accord with the invention is shown in FIG. 5. The corresponding refractive index segments and their respective relative refractive index percents and radii are labeled in agreement with FIG. 4 so that the description thereof need not be repeated. The properties of the waveguide fiber made in accord with FIG. 5 have been adjusted by increasing the minimum index and the radius of segment 30. Segment 38 has been broadened and the relative refractive index percent has been reduced.

The core region profile parameters are, $r_o$ about 1.75 μm, $r_1$ about 3.38 μm, r about 6.06 μm, $\Delta_o\%$ about 0.1%, and $\Delta_1\%$ about 0.57%. The clad layer is uniform and has a relative refractive index percent of zero.

The single mode optical waveguide fiber of FIG. 5 exhibits a fiber cut off wavelength of about 921 μm and a mode field diameter at 1550 nm of 9.3 μm. In addition the mode field diameters at 850 nm and 1310 nm for the single mode optical waveguide fiber of FIG. 5 are 5.2 μm and 7.8 μm respectively. Therefore, coupling efficiency will be acceptable between a VCSEL operating at 850 nm and the waveguide fiber having a profile in accord with FIG. 5. The splicing and connecting efficiency at 1310 nm and 1550 nm, where the Fabry-Perot and DFB lasers, respectively, would be used, can be expected to be substantially the same as that for step index single mode optical waveguide fiber designed for operation at 1310 nm. Additional features of the single mode optical waveguide fiber illustrated in FIG. 5 are that the pin array bend loss at 1550 nm is less than about 21 dB, the lateral load bend loss is about 0.656 dB/m or less and effective area is 69.7 μm², which means that this profile design is expected to consistently provide waveguide fibers that exhibit an effective area greater than 60 μm² and typically greater than 65 μm².

Figure 6:
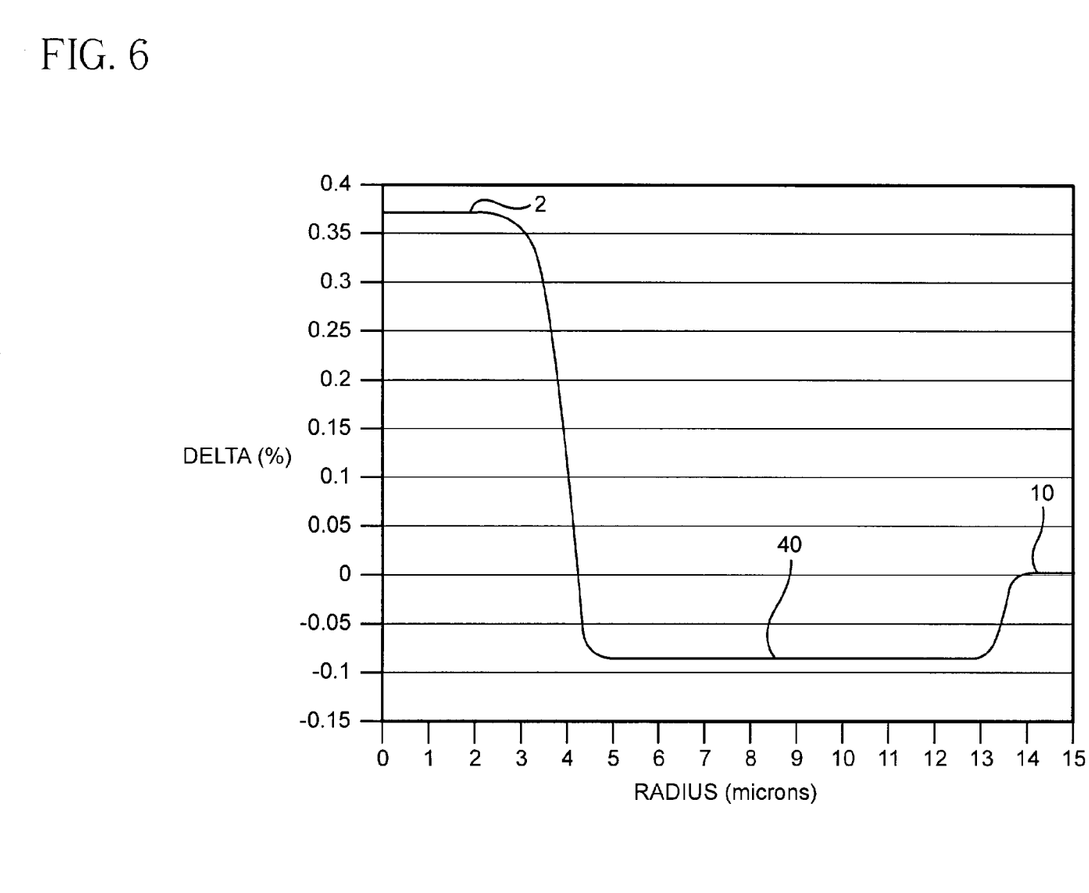
FIG. 6 is a chart of relative refractive index versus radius for an embodiment of the invention in which the first clad region has a negative relative refractive index percent.

The embodiment in accord with the invention illustrated in FIG. 6 is characterized by an annular region 40 of negative relative refractive index percent surrounding a central segment 2. The relative refractive index percent of central segment 2 is in the range from about 0.3% to 0.4% which together with the negative relative refractive index percent of segment 40 serves to confine the mode power sufficiently to provide a desired resistance to bend induced attenuation. In addition, the negative relative refractive index percent annulus lowers cut off wavelength without reducing core diameter. The mode field diameter is therefore maintained large enough to facilitate splicing and connecting. The effective area is reduced somewhat in this refractive index profile configuration. However, the lower average signal power of a VCSEL or Fabry-Perot laser reduces the impact of non-linear dispersion effects. In addition, the access portion of a telecommunication link is typically of short length in comparison to other parts of the system so that dispersion penalties are less severe.

Of the family of refractive index profiles in accord with this embodiment of the invention, the particular one shown in FIG. 6 has central segment 2 of relative refractive index percent about 0.37% and radius about 4.2 μm. The radii for this profile are measured from the centerline of the profile to the points at which the profile crosses the horizontal axis, i.e., the points of zero relative refractive index percent. First annular segment 40 has relative refractive index percent of about −0.09%, inner radius of about 4.2 μm and outer radius of about 14 μm.

The properties provided by the profile shown in FIG. 6 are set forth in the following table.

TABLE

| | |
|---|---|
| Total Dispersion @ 850 nm | −86.4 ps/nm-km |
| Total Dispersion @ 1310 nm | 0.22 ps/nm-km |
| Total Dispersion @ 1550 nm | 16.5 ps/nm-km |
| Mode Field Diameter @ 850 nm | 6.6 μm |
| Mode Field Diameter @ 1310 nm | 8.2 μm |
| Mode Field Diameter @ 1550 nm | 9.2 μm |
| Pin Array Bend Loss @ 850 nm | 0.00 dB |
| Pin Array Bend Loss @ 1310 nm | 0.01 dB |
| Pin Array Bend Loss @ 1550 nm | 19.5 dB |
| Cabled Cut Off Wavelength | <850 nm |

The relatively large mode field diameters, acceptable values of total dispersion, the desired cut off wavelength, and the excellent resistance to bend induced attenuation make this embodiment well suited for use over the entire wavelength range from about 850 nm to about 1600 nm. In particular, the small positive value of total dispersion at 1310 nm indicates the zero dispersion wavelength is slightly less than 1310 nm so that the fiber is compatible with a wider spectral width Fabry-Perot laser operating in the 1310 nm wavelength window. The desirable mode field diameters and resistance to bend shown at the 850 nm, 1310 nm, and 1550 nm wavelengths are properties which characterized the fiber as compatible with essentially any laser source. For example, the fiber will accommodate a narrow spectral width, higher power DFB laser typically used in a distribution hub for the local area. The fiber is also compatible with a VCSEL operating near 850 nm or a Fabry-Perot laser operating near 1310 nm, either of which can be used in other portions of the local access network, for example, to transmit signals from the local nodes back to the hub.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A single mode optical waveguide fiber comprising:
a core region surrounded by a clad layer, said core region having an outside radius; wherein,
said clad layer includes a first region and a second region each having a respective relative refractive index percent, the second region having a relative refractive index percent greater than the relative refractive index percent of the first region, and the first region being located between the core region and the second region of said clad layer; wherein the core region has a relative refractive index percent greater than the respective relative refractive index percents of the first and second regions, and, wherein,
said core region outside radius and said respective relative refractive index percents of the first and second region of said clad layer are selected to provide a single mode optical waveguide fiber in cabled configuration having a cut off wavelength no greater than about 850 nm.

2. The single mode optical waveguide fiber of claim 1 wherein the outside radius of said core region is r and the radius at the beginning of the second region of said clad layer has a range from 2r to 5r.

3. The single mode optical waveguide fiber of claim 2 wherein the radius at the beginning of the second region of said clad layer has a range from 2.5r to 3.5r.

4. The single mode optical waveguide fiber of claim 2 wherein the relative index percent of the second region of said clad layer has a range from 0.05% to 0.10%.

5. The single mode optical waveguide fiber of claim 2 wherein r is greater than or equal to 3.5 μm.

6. The single mode optical waveguide fiber of claim 1 wherein said core region has a refractive index profile, the refractive index profile being an α-profile and α has a range from 0.8 to infinity.

7. The single mode optical waveguide fiber of either one of claim 1 or 6 wherein said core region has a relative index percent in the range from 0.30% to 0.50%.

8. The single mode optical waveguide fiber of either one of claim 1 or 6 wherein said core region has a relative index percent in the range from 0.32% to 0.40%.

9. The single mode optical waveguide fiber of claim 8 wherein induced attenuation at 1500 nm or less in pin array testing is no greater than 8 dB.

10. The single mode optical waveguide fiber of claim 8 herein induced attenuation at 1500 nm or less is no greater than 0.05 dB for 100 turns of said fiber about a 50 mm diameter mandrel.

11. An optical circuit comprising:
a single mode optical waveguide fiber having a cutoff wavelength no greater than about 850 nm; and,
a laser source selected from the group consisting of a vertical cavity surface emitting laser, a Fabry-Perot laser and a distributed feedback laser optically coupled to said single mode optical waveguide fiber.

12. The optical circuit of claim 11 wherein a vertical cavity surface emitting laser and a Fabry-Perot cavity laser or a distributed feedback laser are multiplexed to the single mode optical waveguide fiber.

13. The optical circuit of claim 11 or 12 wherein said single mode optical waveguide fiber has a core region surrounded by a clad layer, said clad layer includes a first region and a second region each having a respective relative refractive index percent, the second region having a relative refractive index percent greater than the relative refractive index percent of the first region, the core region having a relative refractive index percent greater than the respective relative refractive index percents of the first and second regions, and the first region being located between the core region and the second region of said clad layer.

14. The optical circuit of claim 11 or 12 wherein the outside radius of said core region is r and the radius at the beginning of the second region of said clad layer has a range from 2r to 5r.

15. The optical circuit of claim 13 wherein the relative index percent of the second region has a range from 0.05% to 0.10%.

16. The optical circuit of claim 13 wherein r is greater than or equal to 3.5 μm.

17. A single mode optical waveguide fiber comprising:
a core region having a refractive index profile;
a clad layer surrounding said core region and having a refractive index profile; wherein,
the respective refractive index profiles of said core and clad are selected to provide a cut off wavelength for the optical waveguide fiber in cabled configuration no greater than about 850 nm and a mode field diameter at 1550 nm not less than about 8.0 μm.

18. The single mode optical waveguide fiber of claim 17 wherein the mode field diameter at 850 μm is not less than 4.0 μm and the mode field diameter at 1310 nm is not less than about 6.0 μm.

19. The single mode optical waveguide fiber of claim 17 wherein the respective mode field diameters at 850 nm, 1310 nm, and 1550 nm are not less than about 5.0 μm, 7.5 μm, and 9.0 μm.

20. The single mode optical waveguide fiber of claim 17 wherein, said core region has a centerline and a radius r and includes a central segment having a radius $r_o$ and a minimum relative refractive index percent $\Delta_o\%$ surrounded by an annular segment having a radius $r_1$, a relative refractive index percent $\Delta_1\%$, and a portion of decreasing relative index percent, the radius $r_o$ being measured from the centerline to the point nearest the centerline whereat the relative refractive index is $\Delta_1\%$, the radius $r_1$ being measured from the centerline to the intersection of the extrapolation of the decreasing portion with the horizontal line defined by relative refractive index equal to zero, the core radius r being measured from the centerline to the point whereat the relative refractive index of the annular segment is zero, and $\Delta_o\% < \Delta_1\%$, and $r_o < r_1 \leq r$.

21. The single mode optical waveguide fiber of claim 20 wherein $r_o$ has a range from about 0.5 μm to 2.0 μm, $r_1$ has a range from about 2.32 μm to 2.84 μm, r has a range from about 2.7 μm to 3.3 μm, $\Delta_o\%$ has a range from about −0.1% to 0.2% and $\Delta_1\%$ has a range from about 0.75% to 1.3%.

22. The single mode optical waveguide fiber of claim 20 wherein $r_o$ has a range from about 1.57 μm to 1.93 μm, $r_1$ has a range from about 3.04 μm to 3.72 μm, r has a range from about 5.45 μm to 6.67 μm, $\Delta_o\%$ has a range from about 0.09% to 0.11%, and $\Delta_1\%$ has a range from about 0.51% to 0.63%.

23. The single mode optical waveguide fiber of claim 17 wherein said clad layer includes a first region and a second region each having a respective relative refractive index percent, the second region having a relative refractive index percent greater than the relative refractive index percent of the first region, the core region having a relative refractive index percent greater than the respective relative refractive index percents of the first and second regions, and the first region being located between the core region and the second region of said clad layer.

24. The single mode optical waveguide fiber of claim 23 wherein the outside radius of said core region is r and the radius at the beginning of the second region of said clad layer has a range from 2r to 5r.

25. The single mode optical waveguide fiber of claim 24 wherein the radius at the beginning of the second region of said clad layer has a range from 2.5r to 3.5r.

26. The single mode optical waveguide fiber of claim 24 wherein the relative index percent of the second region of said clad layer has a range from 0.05% to 0.10%.

27. The single mode optical waveguide fiber of claim 24 wherein r is greater than or equal to 3.5 μm.

28. The single mode optical waveguide fiber of claim 23 wherein said core region has a refractive index profile, the refractive index profile being an α-profile and α has a range from 0.8 to infinity.

29. The single mode optical waveguide fiber of either one of claim 23 or 28 wherein said core region has a relative index percent in the range from 0.30% to 0.50%.

30. The single mode optical waveguide fiber of either one of claim 23 or 28 wherein said core region has a relative index percent in the range from 0.32% to 0.40%.

31. The single mode optical waveguide fiber of claim 30 wherein induced attenuation at 1500 nm or less in pin array testing is no greater than 8 dB.

32. The single mode optical waveguide fiber of claim 30 herein induced attenuation at 1500 nm or less is no greater than 0.05 dB for 100 turns of said fiber about a 50 mm diameter mandrel.

33. The single mode optical waveguide fiber of claim 17 wherein said core region has a relative refractive index percent in the range from about 0.30% to 0.40% and a radius in the range of 4.0 μm to 4.5 μm and said clad layer includes a first region and a second region each having a radius and a relative refractive index percent, the first region having a relative refractive index percent in the range from about −0.07% to −0.10% and a radius in the range from about 13.5 μm to 14.5 μm, and the second region having a relative refractive index percent of about zero.

34. The single mode optical waveguide fiber of claim 33 wherein the respective mode field diameters at 850 nm, 1310 nm, and 1550 nm are not less than about 6.5 μm, 8.0 μm, and 9.0 μm.

35. The single mode optical waveguide fiber of claim 33 wherein the respective pin array bend losses at 850 nm, 1310 nm, and 1550 nm are not greater than about 0.00 dB, 0.01 dB and 19.47 dB.

* * * * *